US009271167B2

(12) United States Patent
Song et al.

(10) Patent No.: US 9,271,167 B2
(45) Date of Patent: Feb. 23, 2016

(54) DETERMINATION OF RADIO LINK FAILURE WITH ENHANCED INTERFERENCE COORDINATION AND CANCELLATION

(75) Inventors: Osok Song, San Diego, CA (US); Aleksandar Damnjanovic, Del Mar, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 13/083,447

(22) Filed: Apr. 8, 2011

(65) Prior Publication Data

US 2012/0087250 A1 Apr. 12, 2012

Related U.S. Application Data

(60) Provisional application No. 61/323,856, filed on Apr. 13, 2010.

(51) Int. Cl.
*H04W 24/00* (2009.01)
*H04W 24/02* (2009.01)

(52) U.S. Cl.
CPC ..................................... *H04W 24/02* (2013.01)

(58) Field of Classification Search
CPC .................................................... H04W 24/00
USPC .................................. 370/242, 503; 455/436
See application file for complete search history.

(56) References Cited

U.S. PATENT DOCUMENTS

| 4,857,863 A | 8/1989 | Ganger et al. |
|---|---|---|
| 5,051,625 A | 9/1991 | Ikeda et al. |

(Continued)

FOREIGN PATENT DOCUMENTS

| CN | 1311968 A | 9/2001 |
|---|---|---|
| CN | 101018220 A | 8/2007 |

(Continued)

OTHER PUBLICATIONS

International Search Report and Written Opinion—PCT/US2010/048988—International Search Authority, European Patent Office,Feb. 4, 2011.

(Continued)

*Primary Examiner* — Dang Ton
*Assistant Examiner* — Mewale Ambaye
(74) *Attorney, Agent, or Firm* — Tyler J. Overall

(57) ABSTRACT

Existing criteria for analyzing radio link failure conditions may not satisfactorily address the conditions between cells that support cooperative resource coordination. Generally, when the UE declares radio link failure, the UE discontinues communication with a serving base station and searches for a new base station. When the UE lies in a region with severe interference, where the interference is coordinated between base stations by the interfering cell yielding part of its resources, the UE measurements for determining radio link failure (RLF) may vary considerably, depending on whether the measured resources were yielded by the interfering cell. When the UE measures resources which were not yielded by the interfering cell, the UE can erroneously declare RLF (e.g., due to high interference), although the UE can still access the serving cell using resources yielded by the interfering cell. Accordingly, disclosed are aspects for determining RLF based by accounting for cooperative resource coordination employing yielded resources.

21 Claims, 7 Drawing Sheets

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,151,492 A | 11/2000 | Melin |
| 6,167,240 A * | 12/2000 | Carlsson et al. ........... 455/67.13 |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi |
| 8,228,827 B2 | 7/2012 | Jeong et al. |
| 8,363,697 B2 | 1/2013 | Grob et al. |
| 8,446,869 B2 | 5/2013 | Lee et al. |
| 2003/0043928 A1 | 3/2003 | Ling et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer, III |
| 2006/0166693 A1 | 7/2006 | Jeong et al. |
| 2007/0064669 A1 | 3/2007 | Classon et al. |
| 2007/0087691 A1 | 4/2007 | Lee et al. |
| 2007/0104166 A1 | 5/2007 | Rahman et al. |
| 2007/0153719 A1 | 7/2007 | Gopal |
| 2007/0167181 A1 | 7/2007 | Ramesh et al. |
| 2007/0242763 A1 | 10/2007 | Li et al. |
| 2007/0253355 A1 | 11/2007 | Hande et al. |
| 2008/0008212 A1* | 1/2008 | Wang et al. .................... 370/503 |
| 2008/0013500 A1 | 1/2008 | Laroia et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0219236 A1 | 9/2008 | Love et al. |
| 2008/0220791 A1 | 9/2008 | Cho et al. |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1* | 10/2008 | Periyalwar et al. ........... 375/133 |
| 2008/0260062 A1 | 10/2008 | Imamura |
| 2008/0268859 A1 | 10/2008 | Lee et al. |
| 2008/0285513 A1 | 11/2008 | Jung et al. |
| 2009/0046605 A1 | 2/2009 | Gao et al. |
| 2009/0046674 A1 | 2/2009 | Gao et al. |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0131065 A1 | 5/2009 | Khandekar et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1 | 8/2009 | Kawamura et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0298498 A1 | 12/2009 | Pisut et al. |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 | 1/2010 | Petrovic et al. |
| 2010/0029282 A1 | 2/2010 | Stamoulis et al. |
| 2010/0034135 A1 | 2/2010 | Kim et al. |
| 2010/0034158 A1 | 2/2010 | Meylan |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0128690 A1 | 5/2010 | McBeath et al. |
| 2010/0144317 A1 | 6/2010 | Jung et al. |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1 | 10/2010 | Wei et al. |
| 2010/0260156 A1 | 10/2010 | Lee et al. |
| 2010/0265870 A1 | 10/2010 | Cai et al. |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1 | 12/2010 | Choudhury |
| 2010/0331030 A1 | 12/2010 | Nory et al. |
| 2011/0007673 A1 | 1/2011 | Ahn et al. |
| 2011/0013554 A1 | 1/2011 | Koskinen |
| 2011/0032890 A1 | 2/2011 | Wu |
| 2011/0038271 A1 | 2/2011 | Shin et al. |
| 2011/0044227 A1 | 2/2011 | Harrang et al. |
| 2011/0044261 A1 | 2/2011 | Cai et al. |
| 2011/0051684 A1 | 3/2011 | Li et al. |
| 2011/0053603 A1 | 3/2011 | Luo et al. |
| 2011/0064037 A1 | 3/2011 | Wei et al. |
| 2011/0081865 A1 | 4/2011 | Xiao et al. |
| 2011/0116364 A1 | 5/2011 | Zhang et al. |
| 2011/0116437 A1 | 5/2011 | Chen et al. |
| 2011/0134875 A1 | 6/2011 | Ding et al. |
| 2011/0149771 A1 | 6/2011 | Abeta et al. |
| 2011/0149813 A1 | 6/2011 | Parkvall et al. |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |
| 2011/0194514 A1 | 8/2011 | Lee, II et al. |
| 2011/0199986 A1 | 8/2011 | Fong et al. |

(56) References Cited

U.S. PATENT DOCUMENTS

| | | | |
|---|---|---|---|
| 2011/0201279 A1* | 8/2011 | Suzuki et al. | 455/67.11 |
| 2011/0205982 A1 | 8/2011 | Yoo et al. | |
| 2011/0211503 A1 | 9/2011 | Che et al. | |
| 2011/0243075 A1 | 10/2011 | Luo et al. | |
| 2011/0249643 A1 | 10/2011 | Barbieri et al. | |
| 2011/0268032 A1 | 11/2011 | Kim et al. | |
| 2011/0274066 A1 | 11/2011 | Tee et al. | |
| 2011/0275394 A1 | 11/2011 | Song et al. | |
| 2011/0310789 A1 | 12/2011 | Hu et al. | |
| 2011/0310830 A1 | 12/2011 | Wu et al. | |
| 2011/0317624 A1 | 12/2011 | Luo et al. | |
| 2012/0026892 A1 | 2/2012 | Nakao et al. | |
| 2012/0033588 A1 | 2/2012 | Chung et al. | |
| 2012/0033627 A1 | 2/2012 | Li et al. | |
| 2012/0033647 A1 | 2/2012 | Moon et al. | |
| 2012/0039180 A1 | 2/2012 | Kim et al. | |
| 2012/0039208 A1 | 2/2012 | Aydin | |
| 2012/0088516 A1 | 4/2012 | Ji et al. | |
| 2012/0093095 A1 | 4/2012 | Barbieri et al. | |
| 2012/0093097 A1 | 4/2012 | Che et al. | |
| 2012/0106481 A1 | 5/2012 | Cho et al. | |
| 2012/0108239 A1 | 5/2012 | Damnjanovic et al. | |
| 2012/0108255 A1 | 5/2012 | Jo et al. | |
| 2012/0155366 A1 | 6/2012 | Zirwas et al. | |
| 2012/0182958 A1 | 7/2012 | Pelletier et al. | |
| 2012/0212260 A1 | 8/2012 | Chen et al. | |
| 2012/0236798 A1 | 9/2012 | Raaf et al. | |
| 2012/0281656 A1 | 11/2012 | Hooli et al. | |
| 2013/0005344 A1 | 1/2013 | Dimou et al. | |
| 2013/0077543 A1 | 3/2013 | Kim et al. | |
| 2013/0077576 A1 | 3/2013 | Abe et al. | |
| 2013/0229933 A1 | 9/2013 | Ji et al. | |
| 2013/0250927 A1 | 9/2013 | Song | |
| 2014/0036838 A1 | 2/2014 | Yoo et al. | |
| 2014/0146798 A1 | 5/2014 | Damnjanovic et al. | |

FOREIGN PATENT DOCUMENTS

| | | |
|---|---|---|
| CN | 101090281 A | 12/2007 |
| CN | 101155399 A | 4/2008 |
| CN | 101262680 A | 9/2008 |
| CN | 101316267 A | 12/2008 |
| CN | 101400130 A | 4/2009 |
| CN | 101483511 A | 7/2009 |
| CN | 101499882 A | 8/2009 |
| CN | 101505498 A | 8/2009 |
| CN | 101686580 A | 3/2010 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2010541492 A | 12/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2011521512 | 7/2011 |
| JP | 2013502841 A | 1/2013 |
| KR | 20100018453 A | 2/2010 |
| RU | 2305902 C2 | 9/2007 |
| RU | 2007105748 A | 8/2008 |
| WO | WO-0111804 A1 | 2/2001 |
| WO | WO-2004066104 | 8/2004 |
| WO | WO-2004079949 A1 | 9/2004 |
| WO | WO-2005019705 A1 | 3/2005 |
| WO | WO-2005062798 A2 | 7/2005 |
| WO | WO-2005071867 | 8/2005 |
| WO | WO2005109705 | 11/2005 |
| WO | 2005125053 A1 | 12/2005 |
| WO | WO-2006020021 A1 | 2/2006 |
| WO | WO-2006099546 A1 | 9/2006 |
| WO | WO-2007080892 A1 | 7/2007 |
| WO | 2007097671 A1 | 8/2007 |
| WO | WO-2007097672 A1 | 8/2007 |
| WO | 2007108630 A1 | 9/2007 |
| WO | 2007129620 A1 | 11/2007 |
| WO | WO-2007129537 A1 | 11/2007 |
| WO | WO-2008024751 A2 | 2/2008 |
| WO | 2008040448 A1 | 4/2008 |
| WO | 2008041819 A2 | 4/2008 |
| WO | 2008057969 | 5/2008 |
| WO | 2008081816 A1 | 7/2008 |
| WO | 2008086517 | 7/2008 |
| WO | 2008093985 A1 | 8/2008 |
| WO | WO-2008116128 A2 | 9/2008 |
| WO | 2009011059 A1 | 1/2009 |
| WO | 2009016260 A1 | 2/2009 |
| WO | 2009022295 | 2/2009 |
| WO | WO-2009020926 A1 | 2/2009 |
| WO | 2009036367 | 3/2009 |
| WO | 2009043002 | 4/2009 |
| WO | 2009046061 A2 | 4/2009 |
| WO | WO 2010/033957 * | 4/2009 |
| WO | WO-2009048246 A2 | 4/2009 |
| WO | 2009064147 A2 | 5/2009 |
| WO | WO2009062115 | 5/2009 |
| WO | 2009071583 A1 | 6/2009 |
| WO | 2009076803 A1 | 6/2009 |
| WO | 2009078795 A1 | 6/2009 |
| WO | WO-2009067842 A1 | 6/2009 |
| WO | 2009088251 A2 | 7/2009 |
| WO | 2009089798 A1 | 7/2009 |
| WO | 2009096846 A1 | 8/2009 |
| WO | WO-2009126586 | 10/2009 |
| WO | 2009152866 A1 | 12/2009 |
| WO | WO-2010006285 | 1/2010 |
| WO | 2010016726 A2 | 2/2010 |
| WO | WO-2010016607 A1 | 2/2010 |
| WO | WO-2010032791 A1 | 3/2010 |
| WO | WO-2010039738 | 4/2010 |
| WO | WO-2010044903 A2 | 4/2010 |
| WO | 2010110840 A2 | 9/2010 |

OTHER PUBLICATIONS

3GPP: "LS on RV Determination for BCCH," 3GPP TSG RAN WG1 Meeting #54bis, Sep. 29, 2008, R1-084067, <URL: http://www.3gpp.org/ftp/tsg_ran/WG1_RL1/TSGR1_54b/Docs/R1-084067.zip>.

3GPP TS 36.355 V9.0.0, Technical Specification Group Radio Addess Network, E-UTRA, "LTE Positioning Protocal (LLP) (Release 9)" Dec. 2009, 31 pages.

3GPP TSG-RAN WG2 Meeting #68 R2-096531, "Email discussion on MBMS value range [67b#14]", Nov. 9-13, 2009, Jeju, Korea, Discussion and Decision, <URL: http://www.3gpp.org/ftp/tsg_ran/WG2_RL2/TSGR2_68/Docs/R2-096531.zip>, p. 1-13.

Alcatel-Lucent, "Interference Coordination Framework with Results", 3GPP TSG RAN WG1 Meeting #49bis, R1-07-3187, Jun. 29, 2007, pp. 1-9.

Catt,Addition of MBSFN information on X2 interface,[online],3GPPTSG-RAN3 Meeting #64,May 4, 2009, R3-091247,Internet<URL:http://www.3gpp.org/ftp/tsg_ran/WG3_lu/TSGR3_64/Docs/R3-091247.zip>, p. 1-14.

(56) References Cited

OTHER PUBLICATIONS

Huawei, "Consideration on CSI-RS design for CoMP and text proposal to 36.814", 3GPP TSG-RAN WG1#57b R1-092364, Los Angeles, USA Jun. 29-Jul. 3, 2009.

LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGI, no. San Francisco, USA; 20100222-20100226, Feb. 16, 2010, XP050418854, pp. 1-5.

LG Electronics: "Coordination for DL control channel in co-channel HeNB deployment", 3GPP Draft; R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, China; 20100412, Apr. 6, 2010, XP050419640, [retrieved on Apr. 6, 2010].

Motorola: "DCI Format 1C with implicit RV and TBS," 3GPP TSG RAN1 #54, Aug. 18, 2008, R1-083207, 5 pages, <URL: http://www.3gpp.org/ftp/tsg_ran/WG1_RL1/TSGR1_54/Docs/R1-083207.zip>.

NTT Docomo: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010, XP050418740, [retrieved on Feb. 16, 2010]., p. 1-8.

NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, China; 20100412, Apr. 7, 2010, XP050419698, [retrieved on Apr. 7, 2010].

NTT Docomo, "Performance Evaluations of Heterogeneous Networks", 3GPP TSG RAN WG1 Meeting #60, R1-101226, Feb. 26, 2010, pp. 1-18.

Qualcomm Europe: "Coordinated Multi-Point downlink transmission in LTE-Advanced" 3GPP Draft; R1-084400 Comp, 3rd Generation Partnership Project (3GPP), Mobile Competence Centre; 650, Route Des Lucioles ; F-06921 Sophia-Antipolis Cedex; France, no. Prague, Czech Republic; 20081105, Nov. 5, 2008, XP050317663.

Taiwan Search Report—TW100112865—TIPO—Jan. 3, 2014.

Texas Instruments: "Issues on Carrier Aggregation for Advanced E-Utra", 3GPP Draft, R1-090280 TI Carrier AGGR, 3rd Generation Partnership Project (3GPP), Mobile Competence Centre, 650, Route Desa Lucioles, F-06921 Sophia-Antipolis Cedex, France, no. Ljubljana, 20090107, Jan. 7, 2009, XP050318205, p. 1-5, [retrieved on Jan. 7, 2009].

3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009, pp. 1-77, XP002602609.

3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009, pp. 1-17, XP050377589.

3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, no. San Francisco, USA; 20090509, May 9, 2009, pp. 1-34, XP050339706, [retrieved on May 9, 2009].

3GPP TS 36.331 V8.5.0, Radio Resource Control (RRC); Protocol specification (Release 8), 204 pages, 2009.

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP Standard; 3GPP TS 36.300, 3rd Generation Partnership Project (3GPP), Mobile Competence Centre; 650, Route Des Lucioles; F-06921 Sophia-Antipolis Cedex; France, No. V8.8.0, Mar. 1, 2009, pp. 1-157, XP050377583, p. 45, line 3-p. 50, line 15.

Alcatel-Lucent Shanghai Bell et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, no. Los Angeles, USA; Jun. 24, 2009, XP050350848, [retrieved on Jun. 24, 2009].

Ericsson: 3GPP Draft; R3-083577, 3rd Generation Partnership Project (3GPP), Mobile Competence Centre ; 650, Route Des Lucioles ; F-06921 Sophia-Antipolis Cedex ; France, no. Prague, Czech Republic; 20081125, Nov. 25, 2008, XP050324756 [retrieved on Nov. 28, 2008, ] Section 10.1.5.1.

Ericsson: "Simultaneous reception of transport channels in the LTE", 3GPP Draft; 36302__CR0009__(REL-8) R2-093578, 3rd Generation Partnership Project (3GPP), Mobile Competence Centre ; 650, Route Des Lucioles ; F-06921 Sophia-Antipolis Cedex ; France, no. San Francisco, USA; 20090509, May 9, 2009, pp. 1-3, XP050340488, [retrieved on May 9, 2009].

Ericsson: "Structure of System Information", TSGR2#4(99)414, 5 pages, May 1999.

Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, no. Athens, Greece, 20090206, Feb. 6, 2009, XP050318788.

Gale et al., "Distributed discreate resource optimization in Heterogeneous networks". 2008, pp. 560-564, IEEE 04641670.

Garcia F., et al.,"Design of a slew rate controlled output buffer", ASIC Conference 1998. Proceedings. Eleventh Annual IEEE International Rochester, NY, USA Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.

Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL1/TSGR1_61/Docs/ [retrieved on Sep. 30, 2011].

Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010, XP050418632, [retrieved on Feb. 16, 2010].

Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, no. Los Angeles, USA, Jun. 24, 2009, XP050350879, [retrieved on Jun. 24, 2009].

Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, no. Beijing, china; 20100412, Apr. 6, 2010, XP050419318, [retrieved on Apr. 6, 2010].

(56) References Cited

OTHER PUBLICATIONS

Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351434 [retrieved on Aug. 18, 2009] p. 1, paragraph 1.
Inoue et al., "Space time transmit site diversity for OFDM multi base station system", 2002, pp. 30-34, IEEE 01045691.
International Search Report and Written Opinion-PCT/US2011/032367—ISA/EPO—Jul. 27, 2011.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre ; 650, Route Des Lucioles ; F-06921 Sophia-Antipolis Cedex ; France, no. Prague, Czech Republic; 20080923, Sep. 23, 2008, XP050320136, [retrieved on Sep. 23, 2008] the whole document.
Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, no. Shenzhen, China; 20090824, Aug. 24, 2009, XP050388168, [retrieved on Aug. 22, 2009].
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351718 [retrieved on Aug. 18, 2009] p. 1, paragraph 1-paragraph 2.
Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; 20090508, May 8, 2009, XP050339658, [retrieved on May 8, 2009].
Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip .
Qualcomm Inc., "Introduction of time domain ICIC", R2-106943, 3GPP TSG-RAN WG2 Meeting #72, Jacksonville, US, Nov. 15-19, 2010, pp. 4.
Qualcomm Inc., "RRM/RLM resource restriction for time domain ICIC", R2-110698, 3GPP TSG-RAN WG2 Meeting #72-bis, Dublin, Ireland, Jan. 17-21, 2011, pp. 8.
Qualcomm Incorporated: "Extending Rel-8/9 ICIC into Rel-10", 3GPP Draft; R1-101505 Extending REL-8-9 ICIC Into REL-10, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; 20100222, Feb. 16, 2010, XP050418951, [retrieved on Feb. 16, 2010].
Samsung: "Clarification on the parallel receptions for PDSCHs", 3GPP Draft; 36302_CR0010 (REL-8) R2-093579, 3rd Generation Partnership Project (3GPP), Mobile Competence Centre ; 650, Route Des Lucioles ; F-06921 Sophia-Antipolis Cedex ; France, no. San Francisco, USA; 20090519, May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, no. Shenzhen, China; 20090819, Aug. 19, 2009, XP050351683 [retrieved on Aug. 19, 2009] p. 1, paragraph 1.
Samsung: "Inbound mobility to H(e)NBs" 3GPP Draft; R2-093250_ Inbound Mobility to H(E)NBS-R4, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050340933 [retrieved on Apr. 28, 2009] the whole document.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre ; 650, Route Des Lucioles ; F-06921 Sophia-Antipolis Cedex ; France, vol. RAN WG2, no. Kansas City, USA; 20080514, May 14, 2008, XP050140403 [retrieved on May 14, 2008].
Young Jin Sang, et al., "A Self-Organized Femtocell for IEEE 802.16e System", Global Telecommunications Conference, 2009. Globecom 2009. IEEE, IEEE, Piscataway, NJ, USA, Nov. 30, 2009, pp. 1-5, XP031646102, ISBN: 978-1-4244-4148-8.
Gaze C., et al., "Distributed Discrete Resource Optimization in Heterogeneous Networks," IEEE, 2008, pp. 560-564.
3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.
Interdigital Communications: "eICIC Macro-Femto: Time-domain muting and ABS", 3GPP TSG-RAN WG1#63, R1-105951, Nov. 15, 2010, 6 Pages, URL: http://www.3gpp.org/ftp/tsg_ran/WG1_RL1/TSGR1_63/Docs/R1-105951.zip.
LG-NORTEL: "Interference under Type 1 RN", 3GPP TSG-RAN WG1#57, R1-092184, 14 pages, May 4, 2009.
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
Ericsson, Considerations on Non-CA based Heterogeneous Deployments, 3GPP TSG-RAN WG1 #61, R1-102618, ST-Ericsson, 2010, 3 Pages.
LG Electronics, Coordination for DL Control Channel in Co-Channel CSG Deployment, 3GPP TSG RAN WG1 Meeting #61, R1-102704, 2010, 8 Pages.
Huawei et al., "The possible restrictions on the configuration of almost blank subframes in Macro-Pico deployments", 3GPP Draft; R1-105150 The Possible Restrictions on the Configuration of Almost Blank Subframes in Macro-Pi CO Deployments_ vol. 5, 3rd Generation Partnership Project (3GPP), Mobile Competence Centre ; 650, Route Des Lucioles ; F-06921 Sophia-Antipolis Ce, vol. RAN WG1, Oct. 5, 2010, XP050450368, pp. 1-5.
Lopez-Perez D., et al., "OFDMA femtocells: A roadmap on interference avoidance", IEEE Communications Magazine, IEEE Service Center, Piscataway, US, vol. 47, No. 9, Sep. 1, 2009, pp. 41-48, XP011283364, ISSN: 0163-6804, DOI: 10.1109/MCOM.2009.5277454.
Motorola: "HeNB Interference Management", 3GPP TSG-RAN WG1#60 R1-101121, 8,It;URL:http://www.3gpp.org/ftp/tsg5 ran/WG1_RL1/TSGR1_60/Docs/R1-101121.zip>, Feb. 17, 2010, 4 Pages.
Nortel: "Discussions on LTE mobility performance evaluation", 3GPP TSG-RAN WG1#57 R1-091913, <URL:http://www.3gpp.org/ftp/tsg_ran/WG1_RL1/TSGR1_57/Docs/R1-091913.zip>, May 9, 2009, 3 Pages.
Qualcomm Incorporated: "Measurements and feedback extensions for improved operations in HetNets", 3GPP TSG-RAN WG1#60b R1-102353, <URL:http://www.3gpp.org/ftp/tsg_ran/WG1_RL1/TSGR1_60b/Docs/R1-102353.zip>, Apr. 6, 2010, 3 Pages.
TSG-RAN WG4: "Reply to LS on mobility evaluation" 3GPP TSG-RAN WG4#50bis R4-091518, <URL:http://www.3gpp.org/ftp/tsg_ran/WG4_Radio/TSGR4_50bis/Documents/R4-091518.zip>, Mar. 30, 2009, 3 Pages.
ZTE: "Scenarios and Specification Impact of Type 2 Relay", 3GPP TSG-RAN WG1#60 R1-100979, <URL: http://www.3gpp.org/ftp/tsg_ran/WG1_RL1/TSGR1_60/Docs/R1-100979.zip>, Feb. 16, 2010, 7 Pages.

\* cited by examiner

DETERMINATION OF RADIO LINK FAILURE WITH ENHANCED INTERFERENCE COORDINATION AND CANCELLATION

CROSS-REFERENCE TO RELATED APPLICATION

This application claims the benefit under 35 U.S.C. §119(e) to U.S. Provisional Patent Application Ser. No. 61/323,856 entitled DETERMINATION OF RADIO LINK FAILURE WITH ENHANCED INTERFERENCE COORDINATION AND CANCELLATION, filed on Apr. 13, 2010, the disclosure of which is incorporated by reference herein in its entirety.

BACKGROUND

1. Field

Aspects of the present disclosure relate generally to wireless communication systems, and more particularly, to the determination of radio link failure in systems using enhanced interference coordination and cancellation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Existing criteria for analyzing radio link failure conditions may not satisfactorily address the conditions between cells that support cooperative resource coordination. Generally, when the UE declares radio link failure, the UE discontinues communication with a serving base station and searches for a new base station. When the UE lies in a region with severe interference, where the interference is coordinated between base stations by the interfering cell yielding part of its resources, the UE measurements for determining radio link failure (RLF) may vary considerably, depending on whether the measured resources were yielded by the interfering cell. When the UE measures resources which were not yielded by the interfering cell, the UE can erroneously declare an RLF (e.g., due to high interference), although the UE can still access the serving cell using resources yielded by the interfering cell. Accordingly, disclosed are aspects for determining RLF based by accounting for cooperative resource coordination employing yielded resources.

In one aspect, a method of wireless communication is disclosed. The method includes detecting interference from an interfering base station in a network supporting an interference coordination and cancellation mechanism that includes the yielding of at least one wireless transmission resource and assignment of the at least one yielded resource from the interfering base station to a serving base station. A message is received identifying a yielded resource from the interfering base station. In one aspect the received message is a dedicated message. In another aspect, the received message may be a broadcast message and/or an overhead message. A signal quality of the yielded resource is determined and radio link failure is declared when the determined signal quality meets a predetermined threshold value.

Another aspect discloses a system for wireless communication having a memory and at least one processor coupled to the memory. The processor(s) is configured to detect interference from an interfering base station in a network supporting an interference coordination and cancellation mechanism that includes the yielding of at least one wireless transmission resource and assignment of the at least one yielded resource from the interfering base station to a serving base station. The processor receives a dedicated message identifying a yielded resource from the interfering base station. In another aspect the processor receives a broadcast message and/or an overhead message that identifies the yielded resource. The processor determines a signal quality of the yielded resource, and a radio link failure is declared if the determined signal quality meets a predetermined threshold value.

In another embodiment, a computer program product for wireless communications in a wireless network is disclosed. The computer readable medium has program code recorded thereon which, when executed by one or more processors, cause the one or more processors to perform operations of detecting interference from an interfering base station in a network supporting an interference coordination and cancellation mechanism that includes the yielding of at least one wireless transmission resource and assignment of the at least one yielded resource from the interfering base station to a serving base station. The program code also causes the one or more processors to receive a dedicated message identifying a yielded resource from the interfering base station. In another aspect the program code causes the processor to receive a broadcast message and/or an overhead message identifying the yielded resource. The program code also causes the one or more processors to determine a signal quality of the yielded resource and to declare a radio link failure when the determined signal quality meets a predetermined threshold value.

Another aspect discloses an apparatus including a means for detecting interference from an interfering base station in a network supporting an interference coordination and cancellation mechanism that includes the yielding of at least one wireless transmission resource and assignment of the at least one yielded resource from the interfering base station to a serving base station. A means for receiving a message identifying a yielded resource from the interfering base station is also included. In one aspect the received message is a dedicated message. In another aspect, the received message is a broadcast message and/or an overhead message. The apparatus includes a means for determining a signal quality of the yielded resource, and a means for declaring a radio link failure if the determined signal quality meets a predetermined threshold value.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
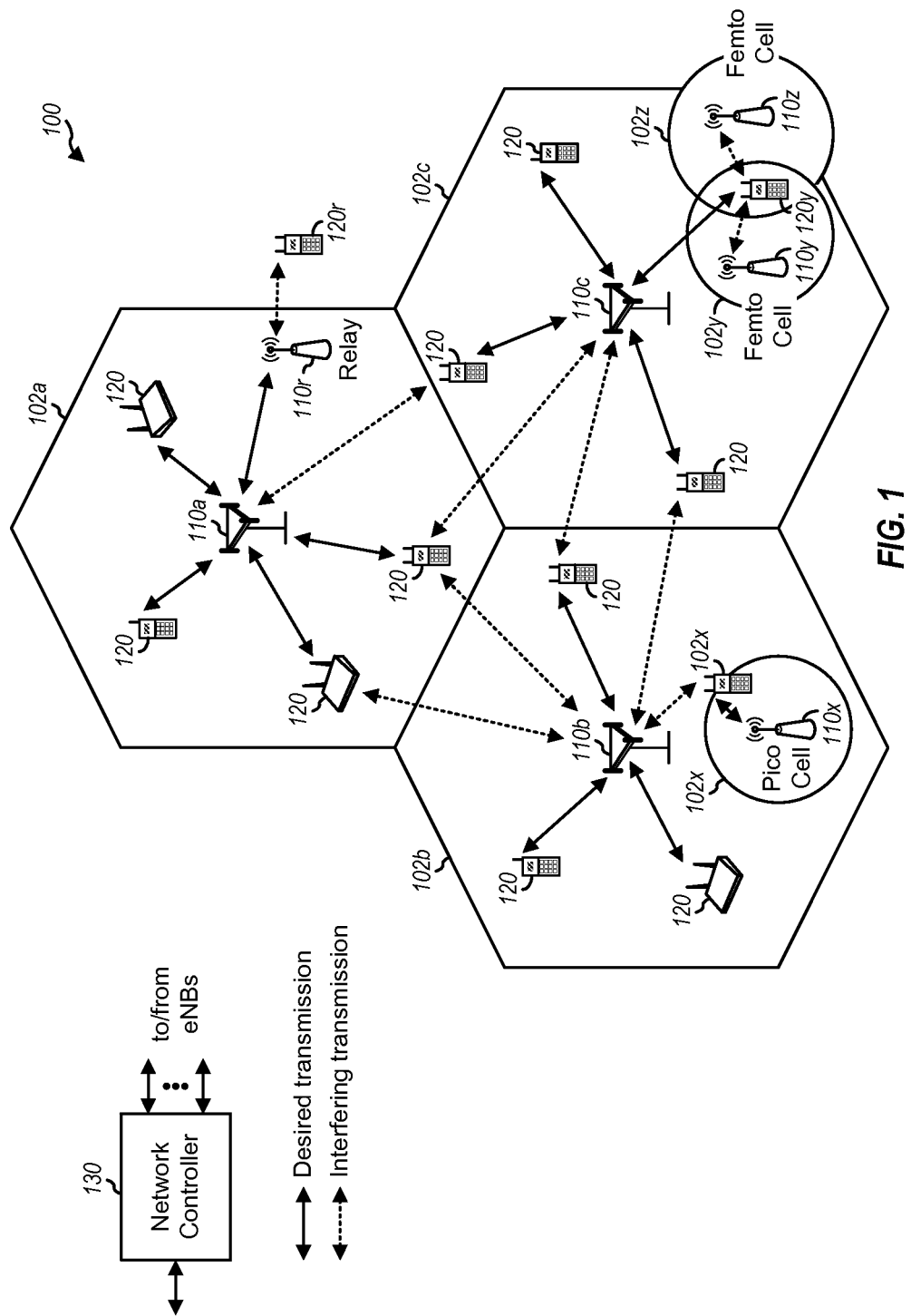
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA.

TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 supports synchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations. In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
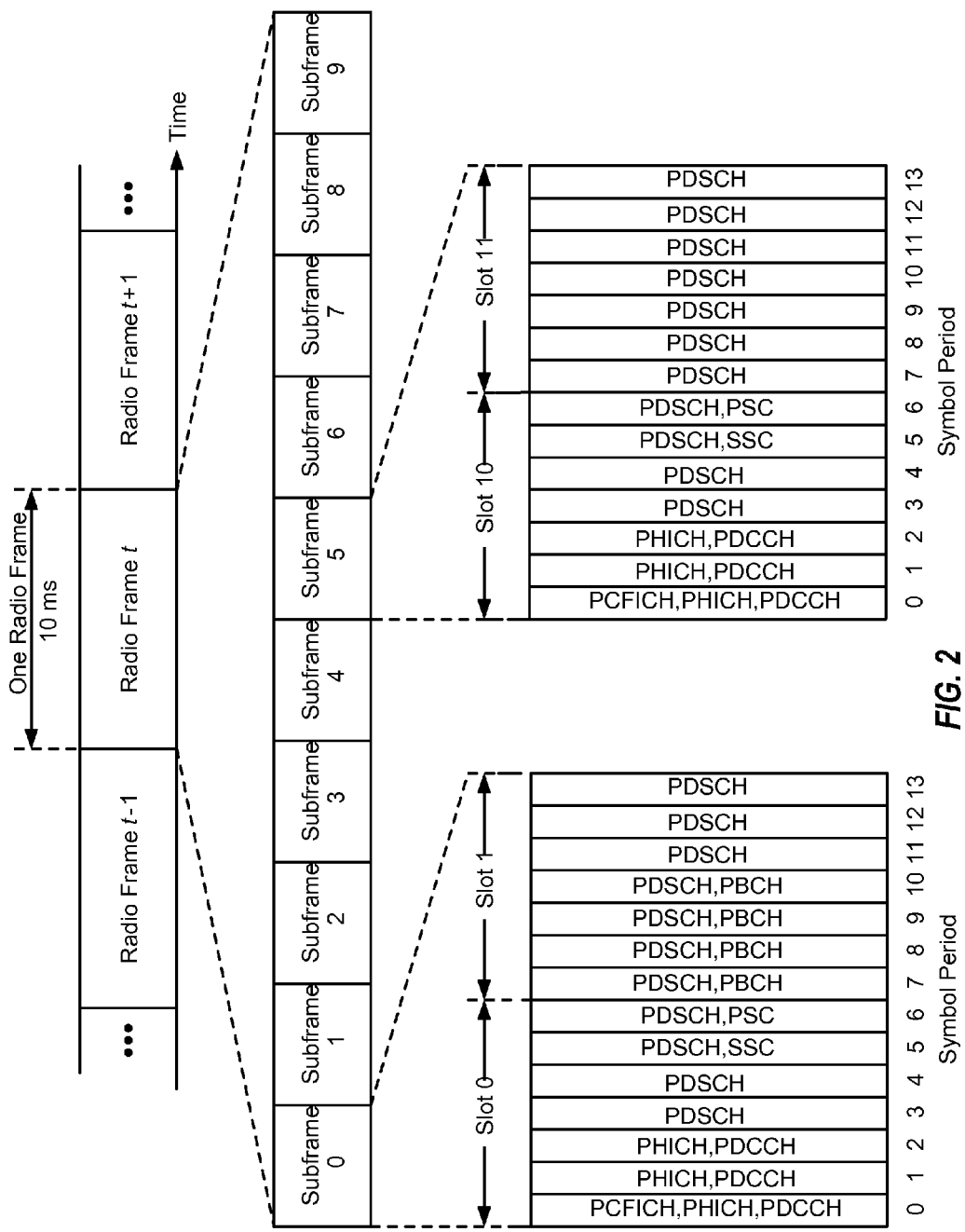
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
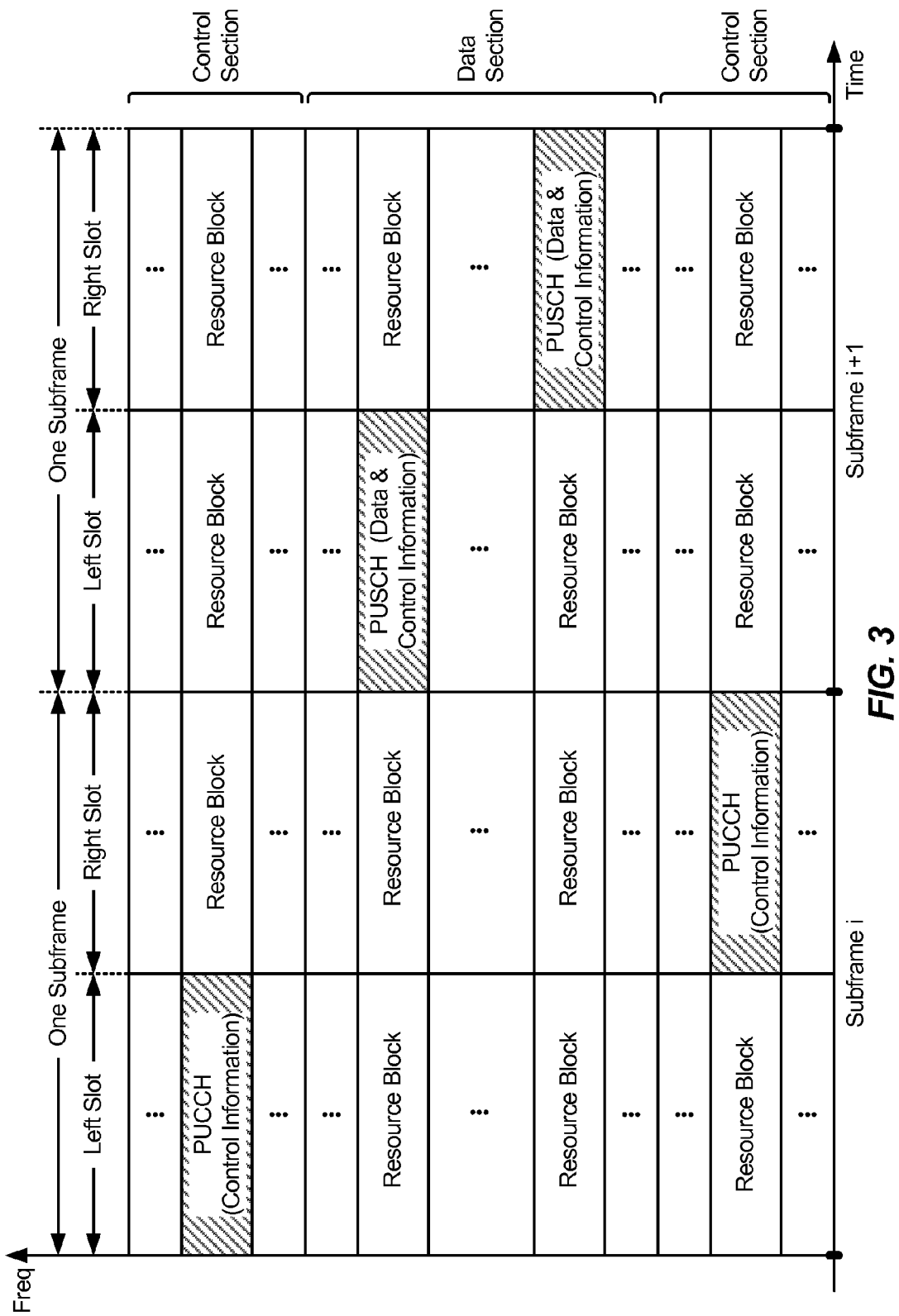
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

Figure 4:
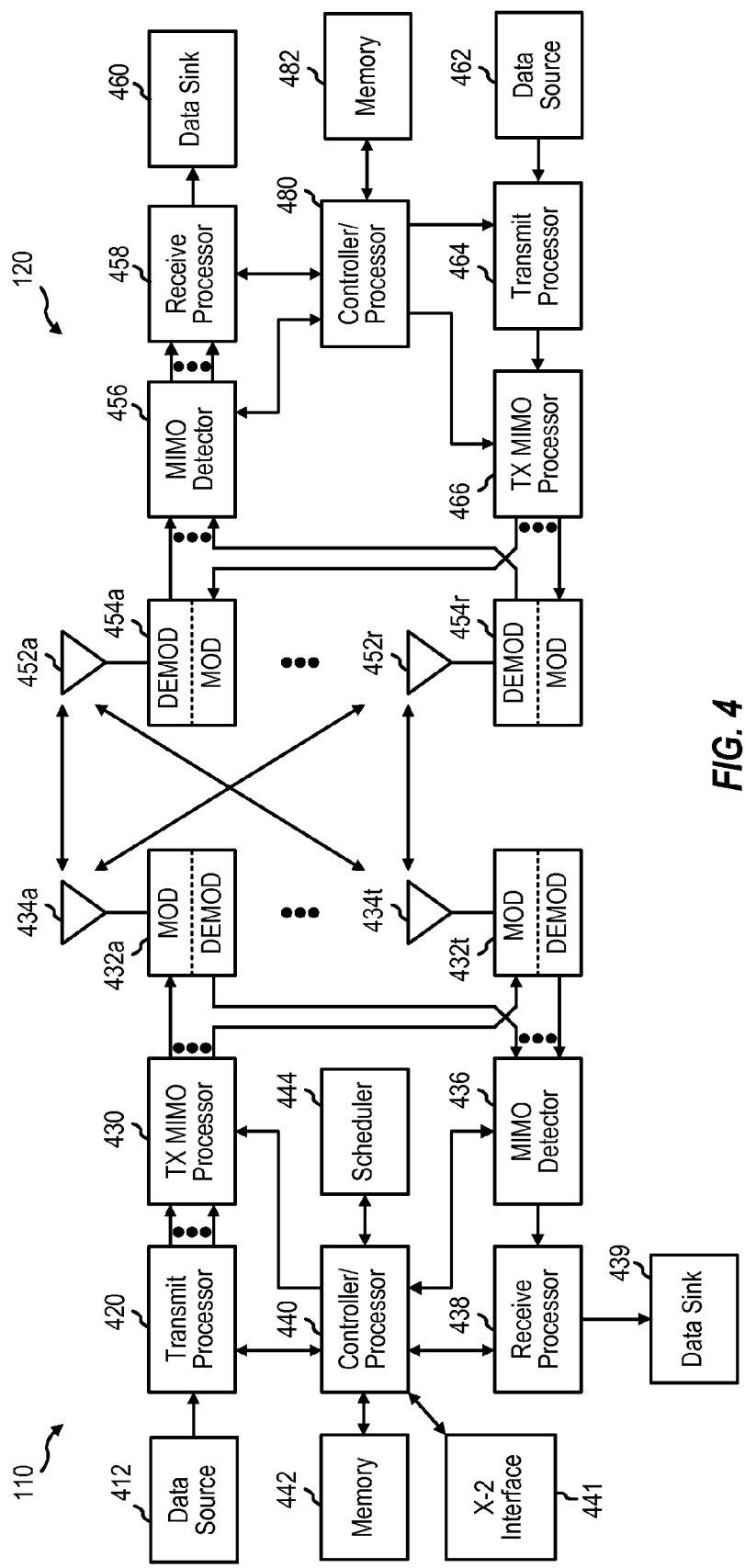
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 7 and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
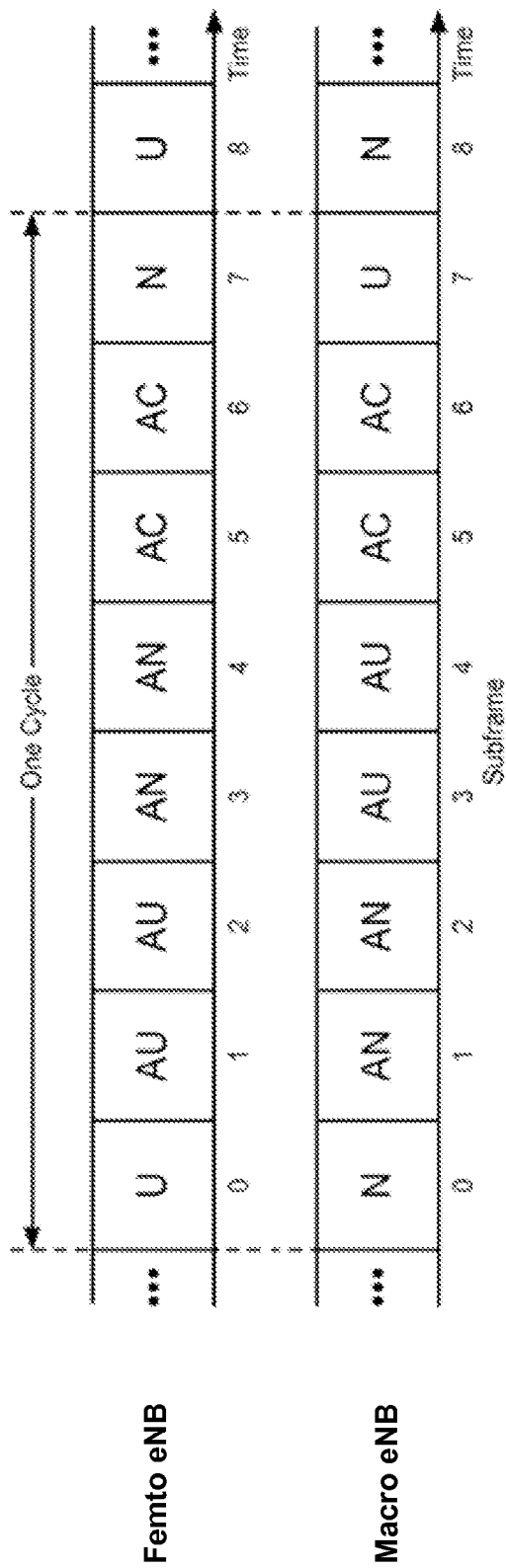
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate subframe assignments for a femto eNodeB, and a second row of blocks illustrate subframe assignments for a macro eNodeB. Each of the eNodeBs has a static protected subframe during which the other eNodeB has a static prohibited subframe. For example, the femto eNodeB has a protected subframe (U subframe) in subframe 0 corresponding to a prohibited subframe (N subframe) in subframe 0. Likewise, the macro eNodeB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNodeB and the macro eNodeB may transmit data.

Protected subframes (such as U/AU subframes) have reduced interference and a high channel quality because aggressor eNodeBs intend not to transmit unicast traffic. In other words, the aggressor eNodeB is not prohibited from transmitting, but rather intends to reduce interference in the protected subframes by avoiding scheduling unicast traffic. Prohibited subframes (such as N/AN subframes) have no data transmission to allow victim eNodeBs to transmit data with low interference levels. Common subframes (such as C/AC subframes) have a channel quality dependent on the number of neighbor eNodeBs transmitting data. For example, if neighbor eNodeBs are transmitting data on the common subframes, the channel quality of the common subframes may be lower than the protected subframes. Channel quality on common subframes may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

A UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may instead connect to the macro eNodeB 110c with lower received power (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. When operating in the connected mode, the UE 120y may experience enough interference in this dominant interference scenario that the UE 120y may no longer be able to maintain a acceptable connection with the eNodeB 110c.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

A dominant interference scenario may also occur due to range extension. Range extension occurs when a UE connects to an eNodeB with lower path loss and lower SNR (signal to noise ratio) among all eNodeBs detected by the UE. For example, in FIG. 1, the UE 120x may detect the macro eNodeB 110b and the pico eNodeB 110x. Further, the UE may have lower received power for the eNodeB 110x than the eNodeB 110b. The UE 120x may connect to the pico eNodeB 110x if the path loss for the eNodeB 110x is lower than the path loss for the macro eNodeB 110b. This may result in less interference to the wireless network for a given data rate for the UE 120x.

In a range extension enabled wireless network, enhanced inter-cell interference coordination (eICIC) may enable the UEs to obtain service from a lower power base station (e.g., a pico base station, femto base station, relay, etc.) in the presence of a macro base station with strong downlink signal strength, and to enable the UEs to obtain service from a macro base station in the presence of a strongly interfering signal from a base station to which the UE is not authorized to connect. As discussed above, eICIC may be used to coordinate resources such that the interfering base station may relinquish some resources and enable control and data transmissions between the UE and the serving base station. When a network supports eICIC, the base stations negotiate and coordinate the use of resources to reduce and/or eliminate interference from the interfering cell relinquishing part of its resources. Accordingly, a UE can access the serving cell even with severe interference by using the resources yielded by the interfering cell.

For a UE that supports eICIC, the existing criteria for analyzing radio link failure conditions may not satisfactorily address the conditions of the coordinating cells. Generally, when the UE declares radio link failure, the UE discontinues communication with the base station and searches for a new base station. When the UE lies in a region with severe interference, where the interference is coordinated between base stations by the interfering cell giving up part of its resources, the UE measurement of the signal to noise ratio (SNR) or the decoding error rate of PDCCH may vary considerably, depending on whether the measured resources were yielded by the interfering cell. When the UE measures the SNR or the decoding error rate of the PDCCH for the resources which were not yielded by the interfering cell, the UE can erroneously declare an RLF due to high interference, although the UE can still access the serving cell using resources yielded by the interfering cell.

Figure 6:
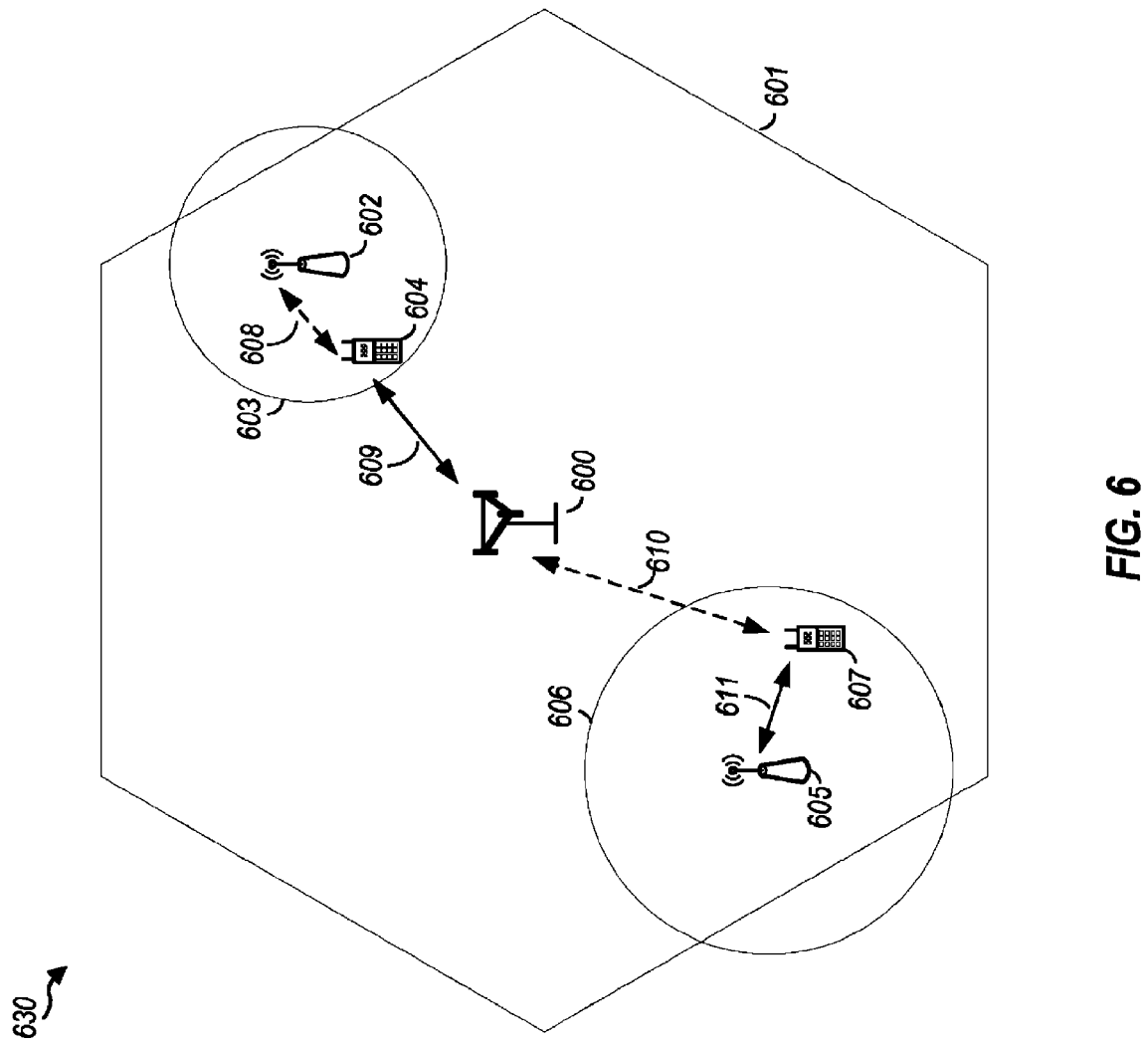
FIG. 6 is a diagram conceptually illustrating a macro cell within an LTE wireless network.

FIG. 6 is a block diagram conceptually illustrating a macro cell 601 within an wireless network 630 configured according to one aspect of the present disclosure. The wireless network 630 is a heterogeneous network in which the macro cell 601 is served by a macro base station 600. Two additional cells, a femto cell 603, served by a femto base station 602, and a pico cell 606, served by a pico base station 605, are overlaid within the coverage area of the macro cell 601. While only the macro cell 601 is illustrated in FIG. 6, the wireless network 630 may include multiple macro cells, similar to the macro cell 601.

A UE 604 is located within the macro cell 601 and also within the femto cell 603. Communications with the femto base station 602 in the femto cell 603 are only available for authorized UEs. In this example, the UE 604 is not authorized to communicate via femto base station 602. Accordingly, the UE 604 maintains communications with the macro base station 600. When the UE 604 enters the femto cell 603, the interference caused by the femto base station 602 through an interfering signal 608 affects the signal quality of the communication signal 609 between the UE 604 and the macro base station 600. As the interference level increases, the UE 604, which supports eICIC, identifies the resources that the femto base station 602 will yield based on the interference coordination with the macro base station 600. The yielded resources may be defined in the time domain, the frequency domain, or even a combination of time and frequency domain resources. When the yielded resources are time-based, the interfering base station 602 does not use some of its accessible subframes in the time domain, as discussed above with reference to FIG. 5. When the yielded resources are frequency-based, the interfering base station 602 does not use some of its accessible subcarriers in the frequency domain. When the yielded resources are a combination of both frequency and time, the interfering base station 602 does not use the resources defined by frequency and time.

Once the yielded resources are identified, the UE 604 obtains the signal quality for the yielded resources. For example the signal quality may be obtained via the error rate for the PDCCH (physical downlink control channel) of the yielded resources. The signal quality information may be obtained by the UE 604 through various analyses of the error rate, including decoding the PDCCH and computing the error rate from the decoded signal, or projecting the error rate from an estimated SNR (signal to noise ratio) of the PDDCH. In one aspect the measurement is a channel state information (CSI), which may include, but is not limited to, one or more of a channel quality indicator (CQI), a Precoding Matrix Indicator (PMI), or a Rank Indicator (RI) measurement. If the error rate of the PDCCH on the yielded resources exceeds a predetermined error rate level, the UE 604 will declare a radio link failure and end the signal connection to the macro base station 600. In one example, radio link failure is declared if the error rate reflects an unacceptably high value and does not allow the yielded resource to adequately support a communication signal. If the error rate of the yielded resources does not exceed a predetermined level, (e.g., a level that allows the yielded resource to adequately support a communication signal), then the UE 604 may continue to access the macro base station 600 through the yielded resources of the femto base station 602.

In another example, prior to obtaining the error rate of the PDCCH on the yielded resources, the UE 604 may identify and cancel interference from common administrative signals transmitted by the femto base station 602 over the yielded resources. Even though the femto base station 602 yields resources pursuant to the eICIC management protocols, the femto base station 602 may only clear and yield the data slots of the yielded subframes. The femto base station 602 maintains administrative slots for transmitting common administrative signals, such as, in E-UTRAN systems, the common reference signal (CRS), PDCCH/PCFICH for broadcast signaling support, system information block (SIB) messages, paging messages, and the like. In one example, prior to determining the signal quality and obtaining the error rate level, the UE 604 will identify such common administrative signals and cancel interference that is attributable to those signals.

In another example, prior to obtaining the error rate of the PDCCH on the yielded resources, the UE 604 identifies which of the resources have been yielded. A variety of methods may be implemented to identify yielded resources. In one example, the UE 604 receives a configuration signal from its serving base station, the macro base station 600, that identifies the yielded resources. The configuration signal may be any of various types of system messages, such as dedicated signaling (e.g., radio resource control (RRC) messages), broadcast messages (e.g., overhead messages such as system information block (SIB) messages), and the like. The configuration signal received from the serving base station may include information such as a range of physical base station identities or a class of base station power, either of which the UE 604 may use to determine which base station is at issue and therefore, which yielded resources are available for obtaining the PDCCH error rate.

In alternative examples, the UE 604 may receive an overhead message transmitted by the interfering base station (e.g., the femto base station 602) rather than receiving a message from the macro base station 600 identifying the yielded resources. When the femto base station 602 yields particular resources pursuant to the eICIC protocol, it broadcasts or transmits an overhead message to any of its clients identifying the particular resources being yielded. In one example, the UE 604 intercepts such overhead signals and reads which resources are yielded.

In other examples, the yielded resources are configured with a pattern of restricted use for the femto base station 602. In such further alternative aspects, the eICIC protocol instructs the femto base station 602 to periodically restrict any use of the specific yielded resources. Within this period of restricted use, the femto base station 602 clears and yields the data slots of the yielded subframes, and also clears and yields all other resources within the yielded subframes, including reference signals. That is, the femto base station 602 does not transmit any common administrative signals over the yielded resources. Various period lengths may be defined, such that the femto base station 602 does not use the yielded resources for a defined length of time. In one example the defined length of time may be in milliseconds (ms) (e.g., every 8 ms, 10, ms, 40 ms, or the like). In such aspects, the UE 604 obtains the error rate of the PDCCH during restricted use periods, and the UE 604 does not listen for any common administrative signals for additional interference cancellation. In one aspect, the periodic resources are MBSFN (multimedia broadcast over a single frequency network) subframes, and thus the UE 604 does not cancel any common administrative signals.

A UE 607 is located within the macro cell 601 and also within the pico cell 606. In accordance with the range extension feature of the LTE-A wireless network 630, the cell load is balanced by coupling the UE 607 to the pico base station 605 for communication. However, the power level for the communication signal 611 between the UE and the pico base station 605 is lower than the power level of an interfering signal 610 transmitted from the macro base station 600. The interference caused by the interfering signal 610 prompts the UE 607 to begin analysis for radio link failure. The UE 607 identifies the yielded resources from the interfering base station, the macro base station 600. In one example, the UE 607 may identify the yielded resources from a setup/release message transmitted from the serving cell (e.g., the pico base station 605). The message may also include a range of physical base station identities or a class of base station power, or other information about the cleared and yielded resources of the interfering base station. As illustrated, the pico cell 606 overlaps the macro cell 601. Accordingly, the pico base station 605 contains the information that identifies the yielded resources of the macro base station 600 in order to implement the range extension feature. It is efficient for the pico base station 605 to transmit this information. In particular, in one aspect, the pico base station is the dominant transmitter and can more easily provide this information to the UE. Once the UE 607 identifies the indicated yielded resources, the UE 607 may obtain the signal quality of the yielded resources, for example, by obtaining the error rate of the PDCCH on those yielded resources. Based on the error rate level, the UE 607 determines whether or not to declare a radio link failure (RLF).

In one example, a specific set of time domain resources (e.g., subframes) and/or frequency domain resource blocks (RBs) are designated as the yielded resources. The resources may include a set of subframes and/or frequency resource blocks that exclude the PDCCH region. To determine radio link failure, this specific set of resources (e.g., subframes) is measured.

In another aspect, a new control channel is defined that was originally part of the data channel. The UE uses this new control channel, R-PDCCH, to obtain the error rate for radio link failure determination. For example, considering the wireless network 630 illustrated in FIG. 6, when the UE 604 detects enough interference from the interfering signal 608 to trigger a radio link failure analysis, the UE 604 obtains resource identification information that identifies a set of subframes and/or frequency resource blocks (RBs). In the example where the set of subframes and/or frequency resource blocks exclude the PDCCH region, the UE 604 does not perform the error rate calculations for the PDCCH. Instead, the UE 604 obtains the signal quality of the yielded resources in other ways, (e.g., using R-PDCCH to obtain the error rate). When the set of subframes designated as the yielded resources is defined in the time and frequency domains, and the set is a subset of the interfering cell's MBSFN subframes, the resource block locations are configured to avoid colliding with the frequency domain control/data channels of the serving cell (i.e., the macro base station 600).

Figure 7:
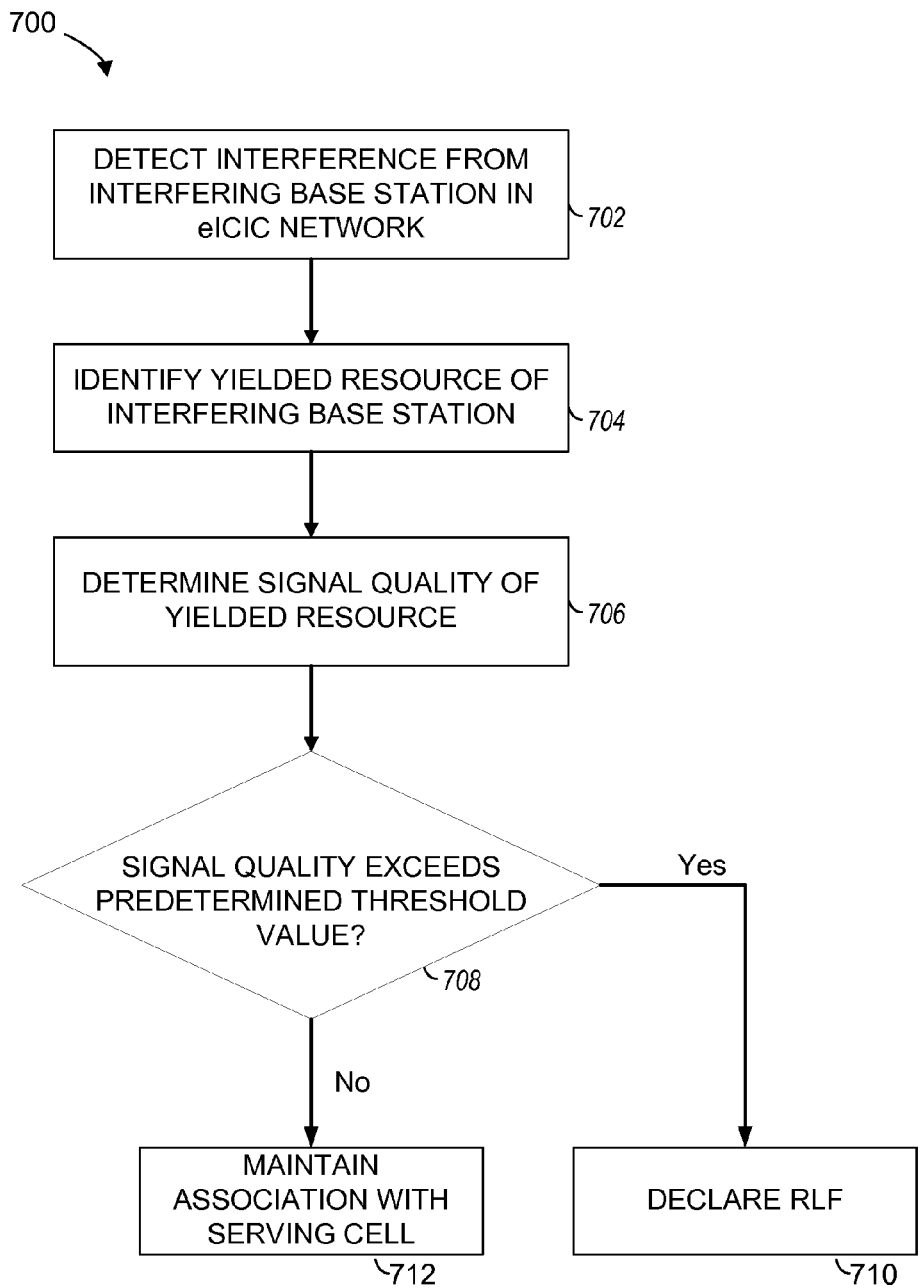
FIG. 7 is a block diagram illustrating a method for determining radio link failure within a wireless network.

FIG. 7 illustrates a method 700 for determining radio link failure (RLF) with enhanced interference coordination. In block 702, a UE detects interference from an interfering base station in a network supporting enhanced interference coordination (eICIC). The UE receives a message identifying a yielded resource of the interfering base station in block 704. In block 706, the UE determines a signal quality (e.g., an error rate of a control channel, such as PDCCH) of the yielded resource. In block 708, the UE determines whether the signal quality exceeds (or is less than, depending on the signal quality metric being used) a predetermined threshold value. Based on the determination, control flow may pass to block 710, where the UE declares radio link failure (RLF). Alternatively, in block 712, the UE may maintain its association with the serving cell.

In one configuration, the UE 120 is configured for wireless communication including means for detecting interference. In one aspect, the detecting means may be the antenna 452a-452r, demodulators 454a-454r, receive processor 458, controller/processor 480 and/or memory 482 configured to perform the functions recited by the selecting means. The UE 120 is also configured to include a means for receiving a message. In one aspect, the receiving means may be the antenna 452a-452r, demodulators 454a-454r, receive processor 458, controller/processor 480 and/or memory 482 configured to perform the functions recited by the transmitting means. The UE 120 is also configured to include a means for determining a signal quality. In one aspect, the determining means may be the controller/processor 480 and/or memory 482 configured to perform the functions recited by the measuring means. The UE 120 is also configured to include a means for declaring radio link failure. In one aspect, the declaring means may be the memory 482, and controller/processor 480 configured to perform the functions recited by the declaring means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    detecting interference from an interfering base station in a network supporting an interference coordination and cancellation mechanism that includes a yielding of at least one wireless transmission resource and assignment of the at least one yielded resource from the interfering base station to a serving base station;
    receiving a dedicated message identifying a resource yielded by the interfering base station;
    determining a signal quality metric of the resource yielded by the interfering base station; and
    declaring a radio link failure if the determined signal quality metric has a predetermined numerical relation with a threshold value.

2. The method of claim 1, in which determining the signal quality metric further comprises:
    receiving common administrative signals transmitted by the interfering base station; and
    canceling interference on the resource yielded by the interfering base station attributed to the common administrative signals.

3. The method of claim 1, in which the dedicated message is a radio resource control (RRC) message.

4. The method of claim 2, in which the dedicated message is at least one of a connection setup, connection reconfiguration, and connection reestablishment message.

5. The method of claim 1, further comprising receiving from the serving base station an indication of the interfering base station, the indication comprising at least one of a range of base station identities and a class of base station power.

6. The method of claim 1, in which the resource yielded by the interfering base station is configured with periodic subframes during which the interfering base station is restricted from transmitting, and a user equipment (UE) determines the signal quality metric during the periodic subframes.

7. The method of claim 1, in which the resource yielded by the interfering base station comprises a first partition having a subset of broadcast subframes from the interfering base station, and a second partition configured to avoid colliding with a frequency domain channels of the serving base station.

8. A method of wireless communication, comprising:
    detecting interference from an interfering base station in a network supporting an interference coordination and cancellation mechanism that includes a yielding of at least one wireless transmission resource and assignment of the at least one yielded resource from the interfering base station to a serving base station;
    receiving a message identifying a resource yielded by the interfering base station, in which the message is at least one of a broadcast message transmitted from the serving base station indicating the resource yielded by the interfering base station, an overhead message transmitted from the interfering base station indicating the resource yielded by the interfering base station, or a combination thereof;
determining a signal quality metric of the resource yielded by the interfering base station; and
declaring a radio link failure if the determined signal quality metric has a predetermined numerical relation with a threshold value.

9. An apparatus for wireless communication, comprising:
a memory; and
at least one processor coupled to the memory, the at least one processor being configured:
to detect interference from an interfering base station in a network supporting an interference coordination and cancellation mechanism that includes a yielding of at least one wireless transmission resource and assignment of the at least one yielded resource from the interfering base station to a serving base station;
to receive a dedicated message identifying a resource yielded by the interfering base station;
to determine a signal quality metric of the resource yielded by the interfering base station; and
to declare a radio link failure if the determined signal quality metric has a predetermined numerical relation with a threshold value.

10. The apparatus of claim 9, the processor further configured to receive common administrative signals transmitted by the interfering base station; and
to cancel interference on the resource yielded by the interfering base station attributed to the common administrative signals.

11. The apparatus of claim 9, in which the dedicated message is a radio resource control (RRC) message.

12. The apparatus of claim 9, in which the dedicated message is a setup and release message.

13. The apparatus of claim 9, the processor further configured to receive from the serving base station an indication of the interfering base station, the indication comprising at least one of a range of base station identities and a class of base station power.

14. The apparatus of claim 9, in which the resource yielded by the interfering base station is configured with periodic subframes during which the interfering base station is restricted from transmitting, and a user equipment (UE) determines the signal quality metric during the periodic subframes.

15. The apparatus of claim 9, in which the resource yielded by the interfering base station comprises a first partition having a subset of broadcast subframes from the interfering base station, and a second partition configured to avoid colliding with a frequency domain channels of the serving base station.

16. An apparatus for wireless communication, comprising:
a memory; and
at least one processor coupled to the memory, the at least one processor being configured:
to detect interference from an interfering base station in a network supporting an interference coordination and cancellation mechanism that includes a yielding of at least one wireless transmission resource and assignment of the at least one yielded resource from the interfering base station to a serving base station;
to receive a message identifying a resource yielded by the interfering base station, in which the message is at least one of a broadcast message transmitted from the serving base station indicating the resource yielded by the interfering base station, an overhead message transmitted from the interfering base station indicating the resource yielded by the interfering base station, or a combination thereof;
to determine a signal quality metric of the resource yielded by the interfering base station; and
to declare a radio link failure if the determined signal quality metric has a predetermined numerical relation with a threshold value.

17. A computer program product for wireless communication in a wireless network, comprising:
a non-transitory computer-readable medium having non-transitory program code recorded thereon, the program code comprising:
program code to detect interference from an interfering base station in a network supporting an interference coordination and cancellation mechanism that includes a yielding of at least one wireless transmission resource and assignment of the at least one yielded resource from the interfering base station to a serving base station;
program code to receive a dedicated message identifying a resource yielded by the interfering base station;
program code to determine a signal quality metric of the resource yielded by the interfering base station; and
program code to declare a radio link failure if the determined signal quality metric has a predetermined numerical relation with a threshold value.

18. A computer program product for wireless communication in a wireless network, comprising:
a non-transitory computer-readable medium having a program code recorded thereon, the program code comprising:
program code to detect interference from an interfering base station in a network supporting an interference coordination and cancellation mechanism that includes a yielding of at least one wireless transmission resource and assignment of the at least one yielded resource from the interfering base station to a serving base station;
program code to receive a message identifying a resource yielded by the interfering base station, in which the message is at least one of a broadcast message transmitted from the serving base station indicating the resource yielded by the interfering base station, an overhead message transmitted from the interfering base station indicating the resource yielded by the interfering base station, or a combination thereof;
program code to determine a signal quality metric of the resource yielded by the interfering base station; and
program code to declare a radio link failure if the determined signal quality metric has a predetermined numerical relation with a threshold value.

19. An apparatus for wireless communication, comprising:
means for detecting interference from an interfering base station in a network supporting an interference coordination and cancellation mechanism that includes a yielding of at least one wireless transmission resource and assignment of the at least one yielded resource from the interfering base station to a serving base station;
means for receiving a dedicated message identifying a resource yielded by the interfering base station;
means for determining a signal quality metric of the resource yielded by the interfering base station; and
means for declaring a radio link failure if the determined signal quality metric has a predetermined numerical relation with a threshold value.

20. An apparatus for wireless communication, comprising:
means for detecting interference from an interfering base station in a network supporting an interference coordination and cancellation mechanism that includes a yielding of at least one wireless transmission resource and assignment of the at least one yielded resource from the interfering base station to a serving base station;
means for receiving a message identifying a resource yielded by the interfering base station, in which the message is at least one of a broadcast message transmitted from the serving base station indicating the resource yielded by the interfering base station, an overhead message transmitted from the interfering base station indicating the resource yielded by the interfering base station, or a combination thereof;
means for determining a signal quality metric of the resource yielded by the interfering base station; and
means for declaring a radio link failure if the determined signal quality metric has a predetermined numerical relation with a threshold value.

21. The method of claim 1, wherein the signal quality metric comprises an error rate of a control channel.

* * * * *

UNITED STATES PATENT AND TRADEMARK OFFICE
CERTIFICATE OF CORRECTION

PATENT NO.         : 9,271,167 B2                                          Page 1 of 1
APPLICATION NO.    : 13/083447
DATED              : February 23, 2016
INVENTOR(S)        : Song et al.

It is certified that error appears in the above-identified patent and that said Letters Patent is hereby corrected as shown below:

On the Title Page

Item (54) and in the Specification, Column 1, Lines 1-4, the portion of the title of the patent reading 'ENHANCED INTERFERENCE COORDINATION AND CANCELLATION' should read --ENHANCED INTERFERENCE COORDINATION--.

In the Claims

Claim 1, Column 16, Lines 18 and 19, delete "and cancellation"; Claim 8, Column 16, Lines 58 and 59, delete "and cancellation.".

Claim 9, Column 17, Line 15, delete "and cancellation"; Claim 16, Column 17, Line 58, delete "and cancellation.".

Claim 17, Column 18, Line 15, delete "and cancellation"; Claim 18, Column 18, Line 34, delete "and cancellation"; Claim 19, Column 18, Line 56, delete "and cancellation.".

Claim 20, Column 19, Line 4, delete "and cancellation.".

Signed and Sealed this
Fourth Day of April, 2017

Michelle K. Lee
*Director of the United States Patent and Trademark Office*